(12) United States Patent
Misawa (10) Patent No.: US 10,797,525 B2
(45) Date of Patent: Oct. 6, 2020

(54) WIRELESS POWER TRANSMISSION APPARATUS AND POWER TRANSFER SYSTEM

(71) Applicant: Toyota Jidosha Kabushiki Kaisha, Toyota-shi, Aichi-ken (JP)

(72) Inventor: Takahiro Misawa, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/190,932

(22) Filed: Nov. 14, 2018

(65) Prior Publication Data

US 2019/0173319 A1 Jun. 6, 2019

(30) Foreign Application Priority Data

Dec. 1, 2017 (JP) .................. 2017-231642

(51) Int. Cl.
| | | |
|---|---|---|
| H02J 5/00 | (2016.01) |
| H02J 50/12 | (2016.01) |
| H02J 7/02 | (2016.01) |
| H02M 7/5387 | (2007.01) |
| B60L 53/12 | (2019.01) |
| H02M 3/337 | (2006.01) |
| H02M 1/00 | (2006.01) |

(Continued)

(52) U.S. Cl.
CPC .............. H02J 50/12 (2016.02); B60L 53/12 (2019.02); H02J 7/025 (2013.01); H02M 3/3376 (2013.01); H02M 7/53871 (2013.01); H02M 1/4225 (2013.01); *H02M 2001/007* (2013.01); *H02M 2001/0048* (2013.01); *H02M 2001/0058* (2013.01); *H02M 2001/327* (2013.01)

(58) Field of Classification Search
CPC . B60L 53/12; H02M 1/4225; H02M 7/53871; H02M 2001/327; H02M 2001/0058; H02M 3/3376; H02M 2001/007; H02M 2001/0048; H02J 7/025; H02J 50/12
See application file for complete search history.

(56) References Cited

U.S. PATENT DOCUMENTS

2013/0127409 A1   5/2013   Ichikawa
2013/0193749 A1   8/2013   Nakamura et al.
(Continued)

FOREIGN PATENT DOCUMENTS

JP   2013-110822 A   6/2013
JP   2013-126327 A   6/2013
(Continued)

*Primary Examiner* — Alfonso Perez Borroto
*Assistant Examiner* — Esayas G Yeshaw
(74) *Attorney, Agent, or Firm* — Dinsmore & Shohl LLP (57) ABSTRACT

A power supply ECU is configured to: adjust magnitude of transmission power by adjusting a duty of an output voltage of an inverter; and adjust a frequency of the transmission power by controlling the inverter. The power supply ECU is configured to execute first control and second control. In the first control, the frequency is adjusted such that a loss of the inverter decreases while maintaining the transmission power, when a temperature of the inverter exceeds a limit temperature. In the second control, the transmission power is reduced, when the temperature of the inverter exceeds the limit temperature even if the first control is executed.

4 Claims, 9 Drawing Sheets

(51) Int. Cl.
　　　*H02M 1/32*　　　(2007.01)
　　　*H02M 1/42*　　　(2007.01)

(56)　　　　References Cited

U.S. PATENT DOCUMENTS

| | | | |
|---|---|---|---|
| 2013/0314965 A1* | 11/2013 | Shinohara | H02M 7/5387 |
| | | | 363/132 |
| 2015/0008877 A1 | 1/2015 | Ichikawa et al. | |
| 2015/0380948 A1* | 12/2015 | Mazaki | H02M 7/217 |
| | | | 307/104 |
| 2016/0064951 A1* | 3/2016 | Yamamoto | H02J 50/20 |
| | | | 307/104 |
| 2016/0156267 A1* | 6/2016 | Shibata | H03K 17/163 |
| | | | 363/131 |
| 2016/0365752 A1 | 12/2016 | Misawa et al. | |
| 2017/0018977 A1* | 1/2017 | Van Wageningen | H02J 5/005 |
| 2018/0342878 A1* | 11/2018 | Nagaoka | H02J 50/12 |

FOREIGN PATENT DOCUMENTS

| | | | |
|---|---|---|---|
| JP | 2013-146148 A | 7/2013 | |
| JP | 2013-146154 A | 7/2013 | |
| JP | 2013-154815 A | 8/2013 | |
| JP | 2017-005865 A | 1/2017 | |

\* cited by examiner

WIRELESS POWER TRANSMISSION APPARATUS AND POWER TRANSFER SYSTEM

CROSS REFERENCE TO RELATED APPLICATIONS

This nonprovisional application claims priority to Japanese Patent Application No. 2017-231642 filed on Dec. 1, 2017 with the Japan Patent Office, the entire contents of which are hereby incorporated by reference.

BACKGROUND

Field

The present disclosure relates to a wireless power transmission apparatus and a power transfer system, and particularly to the technique of controlling an inverter in a wireless power transmission apparatus configured to wirelessly transmit electric power to a power reception apparatus.

Description of the Background Art

A power transfer system configured to wirelessly transfer electric power from a power transmission apparatus to a power reception apparatus is known. Japanese Patent Laying-Open No. 2017-5865 discloses such a power transfer system configured to control transmission power to target power by adjusting a duty of an output voltage of an inverter provided in a power transmission apparatus, and to control a turn-on current of the inverter by adjusting a driving frequency of the inverter.

When a temperature of an inverter increases, the temperature of the inverter does not effectively decrease in some cases in accordance with reduction in transmission power even if the transmission power is reduced. This is probably because when the transmission power is reduced, a power factor becomes worse, and thus, a relatively large amount of current is required (an amount of decrease in current becomes smaller in accordance with the reduction in transmission power). In addition, when the transmission power is reduced, there arises such a problem that the charging time lengthens when a power storage device of a power reception apparatus is charged with the transmission power, for example.

SUMMARY

The present disclosure has been made to solve the above-described problem, and an object of the present disclosure is to effectively reduce a temperature of an inverter when the temperature of the inverter increases, in a wireless power transmission apparatus configured to wirelessly transmit electric power to a power reception apparatus, and a power transfer system including the wireless power transmission apparatus.

A wireless power transmission apparatus according to the present disclosure includes: a power transmission device configured to wirelessly transmit electric power to a power reception apparatus; an inverter configured to generate transmission power having a prescribed frequency and supply the transmission power to the power transmission device; and a control device configured to control the inverter. The control device is configured to: adjust magnitude of the transmission power by adjusting a duty of an output voltage of the inverter; and adjust the frequency by controlling the inverter. The control device is configured to execute first control and second control. The first control is for adjusting the frequency such that a loss of the inverter decreases, while maintaining the transmission power, when a temperature of the inverter exceeds a limit temperature. The second control is for reducing the transmission power, when the temperature of the inverter exceeds the limit temperature even if the first control is executed.

A power transfer system according to the present disclosure includes: a power transmission apparatus; and a power reception apparatus configured to wirelessly receive electric power from the power transmission apparatus. The power transmission apparatus includes: a power transmission device configured to wirelessly transmit electric power to the power reception apparatus; an inverter configured to generate transmission power having a prescribed frequency and supply the transmission power to the power transmission device; and a control device configured to control the inverter. The control device is configured to: adjust magnitude of the transmission power by adjusting a duty of an output voltage of the inverter; and adjust the frequency by controlling the inverter. The control device is configured to execute first control and second control. The first control is for adjusting the frequency such that a loss of the inverter decreases, while maintaining the transmission power, when a temperature of the inverter exceeds a limit temperature. The second control is for reducing the transmission power, when the temperature of the inverter exceeds the limit temperature even if the first control is executed.

In the wireless power transmission apparatus and the power transfer system described above, the first control is first executed when the temperature of the inverter exceeds the limit temperature. In the first control, the frequency is adjusted such that the loss of the inverter decreases, and thus, the temperature of the inverter can be effectively reduced. When the transmission power is reduced, the charging time lengthens, for example, when a power storage device of the power reception apparatus is charged with the transmission power. However, the transmission power is maintained in the first control, and thus, lengthening of the charging time can be avoided.

The first control may include control for adjusting the frequency such that a current of the inverter decreases, while maintaining the transmission power, when the temperature of the inverter exceeds the limit temperature.

Thus, it is possible to reduce the loss of the inverter while maintaining the transmission power by the first control. Therefore, the temperature of the inverter can be effectively reduced.

The loss of the inverter may include: a loss caused by a current flowing through the inverter; and a loss caused by a recovery current flowing through a freewheeling diode of the inverter.

When the frequency is changed, a turn-on current indicating an inverter output current at the time of rising of an inverter output voltage changes, and the loss caused by the recovery current flowing through the freewheeling diode of the inverter also changes due to the turn-on current. With the above-described configuration, the loss of the inverter can be reduced, with consideration given to the loss caused by the recovery current.

The foregoing and other objects, features, aspects and advantages of the present disclosure will become more apparent from the following detailed description of the present disclosure when taken in conjunction with the accompanying drawings.

DETAILED DESCRIPTION

Embodiments of the present disclosure will be described in detail hereinafter with reference to the drawings, in which the same or corresponding portions are denoted by the same reference characters and description thereof will not be repeated.

First Embodiment

Configuration of Power Transfer System

Figure 1:
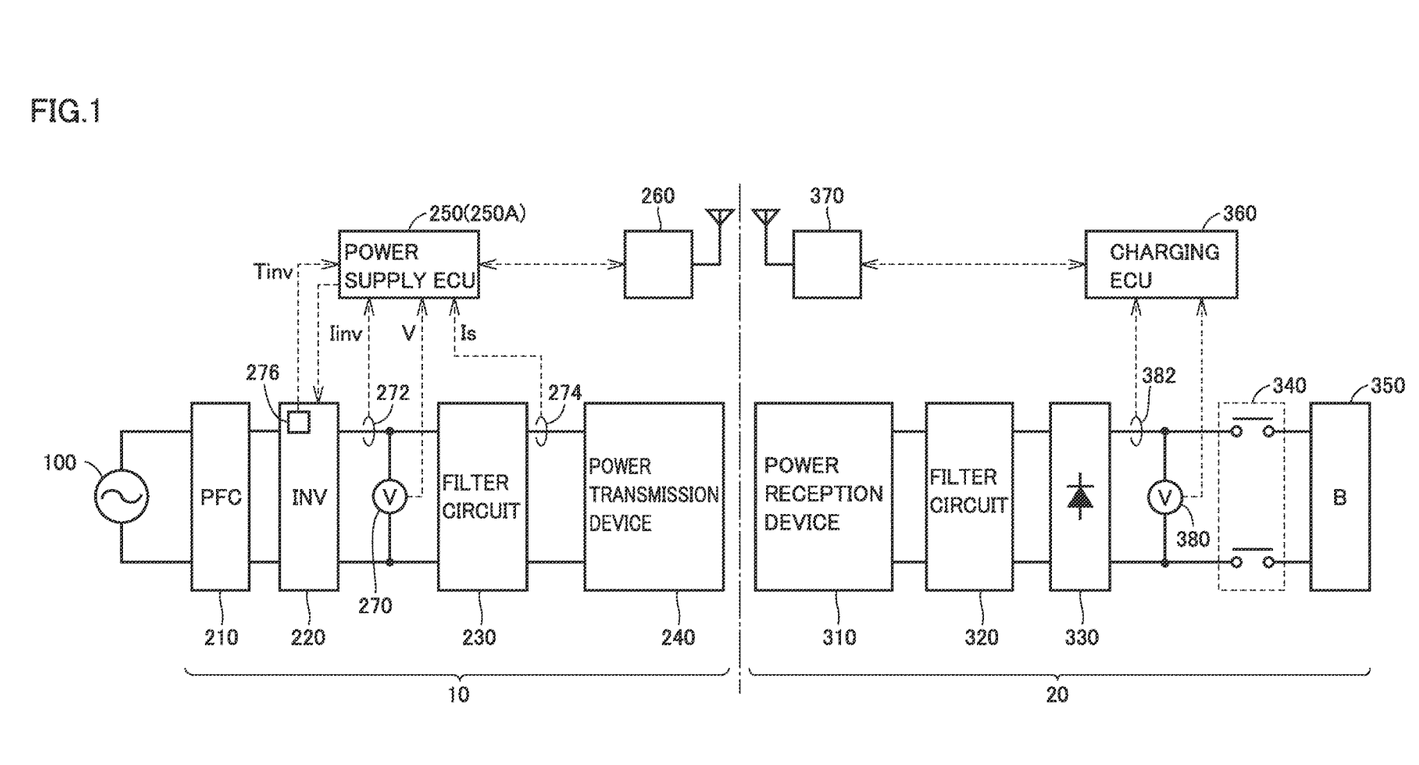
FIG. 1 is an overall configuration diagram of a power transfer system to which a wireless power transmission apparatus according to a first embodiment of the present disclosure is applied.

FIG. 1 is an overall configuration diagram of a power transfer system to which a wireless power transmission apparatus according to a first embodiment of the present disclosure is applied. Referring to FIG. 1, the power transfer system includes a power transmission apparatus 10 and a power reception apparatus 20. Power reception apparatus 20 is mounted on, for example, a vehicle or the like that can travel using electric power supplied from power transmission apparatus 10 and stored.

Power transmission apparatus 10 includes a power factor correction (PFC) circuit 210, an inverter 220, a filter circuit 230, and a power transmission device 240. Power transmission apparatus 10 further includes a power supply ECU (Electronic Control Unit) 250, a communication device 260, a voltage sensor 270, current sensors 272 and 274, and a temperature sensor 276.

PFC circuit 210 rectifies and boosts AC (alternate current) power received from an AC power supply 100 (e.g., a system power supply), and supplies the AC power to inverter 220. PFC circuit 210 can also correct a power factor by bringing an input current closer to a sine wave. Various known PFC circuits can be used as PFC circuit 210. Instead of PFC circuit 210, a rectifier that does not have the power factor correction function may be used.

In accordance with a control signal from power supply ECU 250, inverter 220 converts DC power received from PFC circuit 210 into transmission power (AC) having a prescribed frequency (e.g., tens of kilohertz). Inverter 220 can change the frequency of the transmission power by changing a switching frequency in accordance with a control signal from power supply ECU 250. The transmission power generated by inverter 220 is supplied through filter circuit 230 to power transmission device 240. Inverter 220 is a voltage-type inverter, and a freewheeling diode is connected in antiparallel to each switching element forming inverter 220. Inverter 220 is formed by, for example, a single-phase full-bridge circuit.

Filter circuit 230 is provided between inverter 220 and power transmission device 240, and suppresses a harmonic noise generated from inverter 220. Filter circuit 230 is formed by, for example, an LC filter including an inductor and a capacitor.

Power transmission device 240 receives the transmission power (AC power) generated by inverter 220 through filter circuit 230, and wirelessly transmits the transmission power to a power reception device 310 of power reception apparatus 20 through a magnetic field generated around power transmission device 240. Power transmission device 240 includes, for example, a resonant circuit (not shown) configured to wirelessly transmit electric power to power reception device 310. The resonant circuit can be formed by a coil and a capacitor. However, when a desired resonance state is formed only by the coil, the capacitor does not necessarily need to be provided.

Voltage sensor 270 detects an output voltage V of inverter 220, and outputs the detection value to power supply ECU 250. Current sensor 272 detects a current Iinv flowing through inverter 220, i.e., output current Iinv of inverter 220, and outputs the detection value to power supply ECU 250. Based on the detection values of voltage sensor 270 and current sensor 272, the transmission power supplied from inverter 220 to power transmission device 240 can be detected.

Current sensor 274 detects a current Is flowing through power transmission device 240, and outputs the detection value to power supply ECU 250. Temperature sensor 276 detects a temperature Tinv of inverter 220, and outputs the detection value to power supply ECU 250.

Power supply ECU 250 includes a CPU (Central Processing Unit), a storage device, an input and output buffer, and the like (all are not shown). Power supply ECU 250 receives the signals from the above-described sensors and the like, and controls the devices in power transmission apparatus 10. As one example, power supply ECU 250 executes switching control of inverter 220 such that inverter 220 generates the transmission power having the prescribed frequency, when power transfer from power transmission apparatus 10 to power reception apparatus 20 is executed. Various types of control are not limited to processing by software, and can also be implemented by dedicated hardware (electronic circuit).

In power transmission apparatus 10 according to the first embodiment, as main control executed by power supply ECU 250, power supply ECU 250 executes control for controlling the magnitude of the transmission power to target power (hereinafter also referred to as "transmission power control"), when power transfer from power transmission apparatus 10 to power reception apparatus 20 is executed. Specifically, power supply ECU 250 controls the magnitude of the transmission power to the target power by adjusting a duty of output voltage V of inverter 220.

The duty of the output voltage of the inverter is defined as a ratio of the positive (or negative) voltage output time to a cycle of an output voltage waveform (rectangular wave). The duty of the inverter output voltage can be adjusted by changing the operation timing of each switching element (on/off duty: 0.5) of inverter 220. In addition, the target power can be generated based on, for example, a state of power reception by power reception apparatus 20. In the first embodiment, in power reception apparatus 20, the target power of the transmission power is generated based on a difference between a target value and a detection value of received power, and is transmitted from power reception apparatus 20 to power transmission apparatus 10.

Power supply ECU 250 executes the above-described transmission power control, and also executes control for suppressing temperature Tinv (hereinafter also referred to as "temperature suppression control"), when temperature Tinv of inverter 220 exceeds a limit temperature. Specifically, power supply ECU 250 adjusts the frequency of the transmission power such that current Iinv of inverter 220 decreases, while maintaining the magnitude of the transmission power by the transmission power control, when temperature Tinv exceeds the limit temperature (first control). Power supply ECU 250 reduces the transmission power by the transmission power control, when temperature Tinv exceeds the limit temperature even if the frequency is adjusted (second control). This temperature suppression control will be described in detail below.

Power supply ECU 250 executes control for optimizing the efficiency of the power transfer system (hereinafter also referred to as "efficiency optimization control"), when temperature Tinv is lower than the limit temperature. Specifically, as described below, the power transfer efficiency between power transmission device 240 and power reception device 310 of power reception apparatus 20 can be made higher as current Is flowing through power transmission device 240 becomes smaller. Thus, power supply ECU 250 increases the power transfer efficiency between power transmission device 240 and power reception device 310, and adjusts the frequency such that a sum of current Is flowing through power transmission device 240 and current Iinv flowing through inverter 220 is minimized, with consideration given to a loss of inverter 220.

Communication device 260 is configured to wirelessly communicate with a communication device 370 of power reception apparatus 20. Communication device 260 receives a target value of the transmission power (target power) transmitted from power reception apparatus 20, and exchanges information about start/stop of power transmission, a state of power reception by power reception apparatus 20, and the like with power reception apparatus 20.

On the other hand, power reception apparatus 20 includes power reception device 310, a filter circuit 320, a rectification device 330, a relay circuit 340, and a power storage device 350. Power reception apparatus 20 further includes a charging ECU 360, a communication device 370, a voltage sensor 380, and a current sensor 382.

Power reception device 310 wirelessly receives the electric power (AC) output from power transmission device 240 of power transmission apparatus 10 through the magnetic field. Power reception device 310 includes, for example, a resonant circuit (not shown) configured to wirelessly receive the electric power from power transmission device 240. The resonant circuit can be formed by a coil and a capacitor. However, when a desired resonance state is formed only by the coil, the capacitor does not necessarily need to be provided. Power reception device 310 outputs the received electric power to rectification device 330 through filter circuit 320.

Filter circuit 320 is provided between power reception device 310 and rectification device 330, and suppresses a harmonic noise generated during power reception by power reception device 310. Filter circuit 320 is formed by, for example, an LC filter including an inductor and a capacitor. Rectification device 330 rectifies the AC power received by power reception device 310, and outputs the rectified power to power storage device 350. Rectification device 330 is formed to include a smoothing capacitor together with a rectifier.

Power storage device 350 is a rechargeable DC power supply and is formed by, for example, a secondary battery such as a lithium-ion battery or a nickel hydride battery. Power storage device 350 stores the electric power output from rectification device 330. Power storage device 350 supplies the stored electric power to a not-shown load driving device and the like. An electric double layer capacitor and the like can also be used as power storage device 350.

Relay circuit 340 is provided between rectification device 330 and power storage device 350. Relay circuit 340 is turned on (conducting state) when power storage device 350 is charged by power transmission apparatus 10. Although not particularly shown, a DC/DC converter configured to adjust an output voltage of rectification device 330 may be provided between rectification device 330 and power storage device 350 (e.g., between rectification device 330 and relay circuit 340).

Voltage sensor 380 detects the output voltage (power reception voltage) of rectification device 330, and outputs the detection value to charging ECU 360. Current sensor 382 detects an output current (power reception current) from rectification device 330, and outputs the detection value to charging ECU 360. Based on the detection values of voltage sensor 380 and current sensor 382, the received power by power reception device 310 (i.e., charging power of power storage device 350) can be detected. Voltage sensor 380 and current sensor 382 may be provided between power reception device 310 and rectification device 330 (e.g., between filter circuit 320 and rectification device 330).

Charging ECU 360 includes a CPU, a storage device, an input and output buffer, and the like (all are not shown). Charging ECU 360 receives the signals from the above-described sensors and the like, and controls the devices in power reception apparatus 20. Various types of control are not limited to processing by software, and can also be implemented by dedicated hardware (electronic circuit).

As main control executed by charging ECU 360, charging ECU 360 generates the target value of the transmission power (target power) in power transmission apparatus 10 such that the received power in power reception apparatus 20 has a desired target value during power reception from power transmission apparatus 10. Specifically, charging ECU 360 generates the target value of the transmission power in power transmission apparatus 10 based on a difference between a detection value and a target value of the received power. Charging ECU 360 transmits the generated target value of the transmission power (target power) to power transmission apparatus 10 by communication device 370.

Communication device 370 is configured to wirelessly communicate with communication device 260 of power transmission apparatus 10. Communication device 370 transmits the target value of the transmission power (target power) generated by charging ECU 360 to power transmission apparatus 10. Communication device 370 also exchanges information about start/stop of power transfer with power transmission apparatus 10, and transmits a state of power reception (such as the power reception voltage, the power reception current and the received power) by power reception apparatus 20 to power transmission apparatus 10.

In this power transfer system, in power transmission apparatus 10, the AC power having the prescribed frequency is supplied from inverter 220 through filter circuit 230 to power transmission device 240. Each of power transmission device 240 and power reception device 310 is designed to include the resonant circuit and resonate at the frequency of the AC power.

When the AC power is supplied from inverter 220 through filter circuit 230 to power transmission device 240, the energy (electric power) moves from power transmission device 240 to power reception device 310 through the magnetic field formed between the coil forming the resonant circuit of power transmission device 240 and the coil forming the resonant circuit of power reception device 310. The energy (electric power) having moved to power reception device 310 is supplied to power storage device 350 through filter circuit 320 and rectification device 330.

Figure 2:
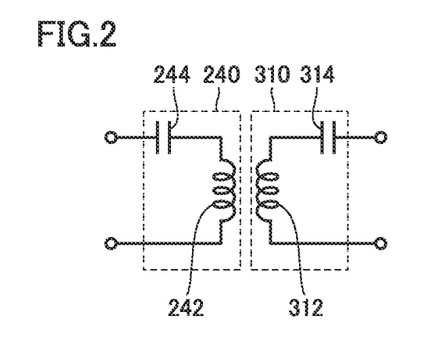
FIG. 2 shows one example of a circuit configuration of a power transmission device and a power reception device shown in FIG. 1.

FIG. 2 shows one example of a circuit configuration of power transmission device 240 and power reception device 310 shown in FIG. 1. Referring to FIG. 2, power transmission device 240 includes a coil 242 and a capacitor 244. Capacitor 244 is connected in series to coil 242 to form a resonant circuit together with coil 242. Capacitor 244 is provided to adjust a resonance frequency of power transmission device 240. A Q value indicating a resonance intensity of the resonant circuit formed by coil 242 and capacitor 244 is not less than 100 in some embodiments.

Power reception device 310 includes a coil 312 and a capacitor 314. Capacitor 314 is connected in series to coil 312 to form a resonance circuit together with coil 312. Capacitor 314 is provided to adjust a resonance frequency of power reception device 310. A Q value of the resonant circuit formed by coil 312 and capacitor 314 is also not less than 100 in some embodiments.

In each of power transmission device 240 and power reception device 310, the capacitor may be connected in parallel to the coil. When a desired resonance frequency can be achieved without including the capacitor, the capacitor does not necessarily need to be provided.

Although not particularly shown, the structure of coils 242 and 312 is not particularly limited. For example, when power transmission device 240 and power reception device 310 face each other, a voluted or spiral-shaped coil wound around a shaft along a direction of alignment of power transmission device 240 and power reception device 310 can be used as each of coils 242 and 312. Alternatively, when power transmission device 240 and power reception device 310 face each other, a coil formed by winding a wire around a ferrite plate, with a direction of alignment of power transmission device 240 and power reception device 310 being a normal direction, may be used as each of coils 242 and 312.

Figure 3:
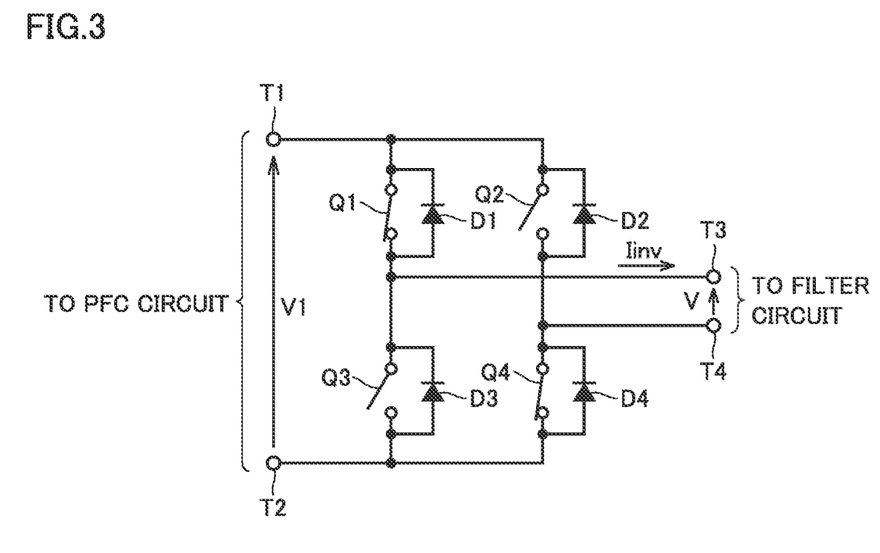
FIG. 3 shows one example of a circuit configuration of an inverter shown in FIG. 1.

FIG. 3 shows one example of a circuit configuration of inverter 220 shown in FIG. 1. Referring to FIG. 3, inverter 220 is a voltage-type inverter and includes power semiconductor switching elements (hereinafter also simply referred to as "switching elements") Q1 to Q4 and freewheeling diodes D1 to D4. PFC circuit 210 (FIG. 1) is connected to DC-side terminals T1 and T2, and filter circuit 230 is connected to AC-side terminals T3 and T4.

Each of switching elements Q1 to Q4 is formed by, for example, an IGBT (Insulated Gate Bipolar Transistor), a bipolar transistor, a MOSFET (Metal Oxide Semiconductor Field Effect Transistor), a GTO (Gate Turn Off thyristor) or the like. Freewheeling diodes D1 to D4 are connected in antiparallel to switching elements Q1 to Q4, respectively.

A DC voltage V1 output from PFC circuit 210 is applied between terminals T1 and T2. With the switching operation by switching elements Q1 to Q4, output voltage V and output current Iinv are generated between terminals T3 and T4 (in the figure, a direction indicated by an arrow is defined as a positive value). As one example, FIG. 3 shows a state in which switching elements Q1 and Q4 are ON and switching elements Q2 and Q3 are OFF, and output voltage V in this case is almost voltage V1 (positive value).

Description of Temperature Suppression Control

When the temperature of inverter 220 increases, it is conceivable to suppress the temperature of inverter 220 by reducing the transmission power and thereby reducing the current flowing through inverter 220 and suppressing the heat generation of inverter 220. However, in the above-described power transfer system, even if the transmission power is reduced, the temperature of inverter 220 does not effectively decrease in some cases in accordance with the reduction in transmission power.

Figure 4:
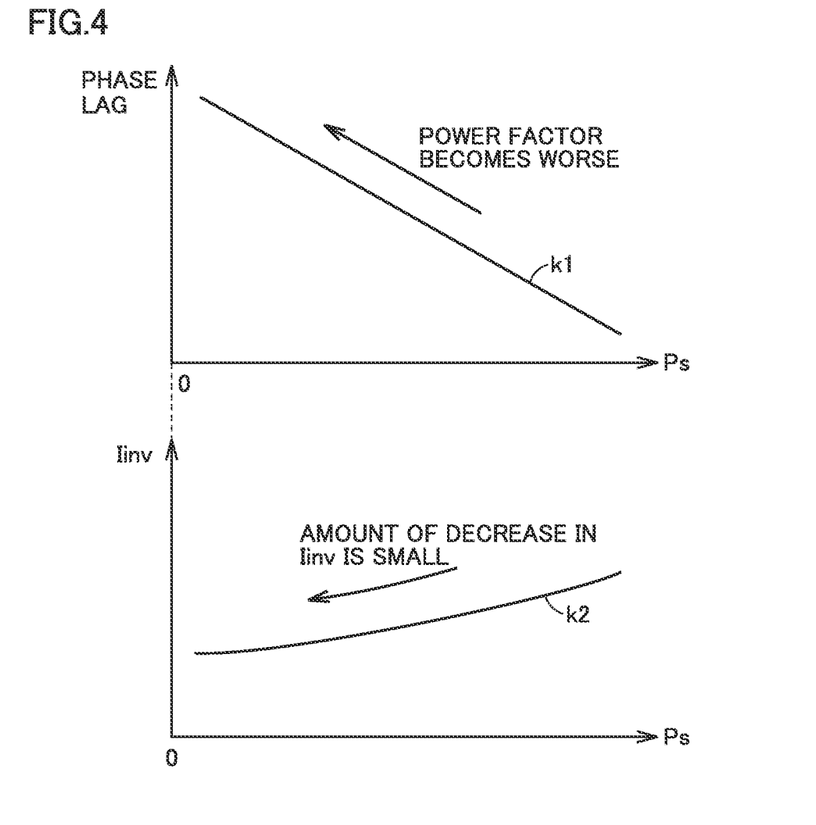
FIG. 4 shows a current phase lag and the transmission power dependence of an inverter current.

FIG. 4 shows a current phase lag and the transmission power dependence of an inverter current. Referring to FIG. 4, a line k1 represents the relation between the magnitude of transmission power Ps and a phase lag of output current Iinv with respect to output voltage V of inverter 220 (hereinafter may be simply referred to as "phase lag"). A line k2 represents the relation between the magnitude of transmission power Ps and the magnitude of output current Iinv of inverter 220.

As indicated by line k2, a change in current Iinv with respect to a change in transmission power Ps is small (an inclination of line k2 is small), and inverter 220 has low sensitivity of current Iinv to transmission power Ps. Furthermore, as indicated by line k1, when transmission power Ps is reduced, the phase lag becomes greater and a power factor becomes worse. Therefore, as indicated by line k2, as transmission power Ps becomes smaller, an amount of decrease in current Iinv with respect to reduction in transmission power Ps becomes smaller. This is because the power factor becomes worse as transmission power Ps becomes smaller, and thus, a relatively large amount of current is required.

As described above, when temperature Tinv of inverter 220 increases, the amount of decrease in current Iinv is small even if transmission power Ps is reduced. Temperature Tinv of inverter 220 can be reduced by reducing the loss of inverter 220, and the loss of inverter 220 depends on the magnitude of current Iinv of inverter 220. Therefore, the amount of decrease in current Iinv is small even if transmission power Ps is reduced, and thus, temperature Tinv cannot be effectively reduced.

In addition, when transmission power Ps is reduced, the received power of power reception apparatus 20 is also reduced. Therefore, if transmission power Ps is reduced when temperature Tinv of inverter 220 increases, there arises such a problem that the time of charging of power storage device 350 by power transmission apparatus 10 lengthens.

Accordingly, in power transmission apparatus 10 according to the first embodiment, when temperature Tinv of inverter 220 exceeds the limit temperature, the frequency is adjusted such that current Iinv of inverter 220 decreases, while maintaining the magnitude of transmission power Ps by the transmission power control. By adjusting the frequency, it is possible to reduce current Iinv of inverter 220, while maintaining the magnitude of transmission power Ps by the transmission power control.

Figure 5:
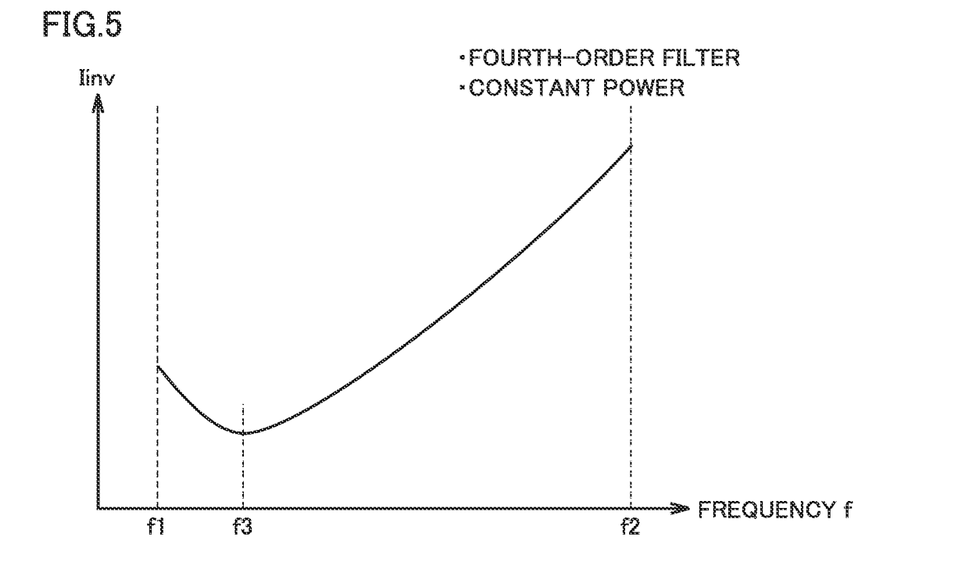
FIG. 5 shows by way of example the frequency dependence of the inverter current under constant transmission power.

FIG. 5 shows by way of example the frequency dependence of current Iinv of inverter 220 under constant transmission power. Referring to FIG. 5, in this example, in a range (f1 to f2) where frequency f can be adjusted, current Iinv shows a downward convex curve with respect to a change in frequency. A frequency f3 is a frequency at which the magnitude of current Iinv is minimum (local minimum) in the range where frequency f can be adjusted.

Based on the frequency dependence of the magnitude of current Iinv described above, it is understood that current Iinv can be reduced by adjusting frequency f. For example, when frequency f is a frequency other than frequency f3, frequency f is adjusted such that frequency f comes closer to f3, and thereby, current Iinv of inverter 220 can be reduced without reducing the transmission power. As a result, temperature Tinv of inverter 220 can be suppressed.

In the first embodiment, when temperature Tinv of inverter 220 is lower than the limit temperature and the above-described temperature suppression control is not executed, the efficiency optimization control for optimizing the frequency of the entire power transfer system is executed. Specifically, as current Is flowing through power transmission device 240 becomes smaller, the power transfer efficiency between power transmission device 240 and power reception device 310 can be made higher. Therefore, frequency f is adjusted such that a sum of current Is flowing through power transmission device 240 and current Iinv flowing through inverter 220 is minimized, with consideration given to reduction in loss of inverter 220. The relation between current Is flowing through power transmission device 240 and the power transfer efficiency will be simply described below.

Figure 6:
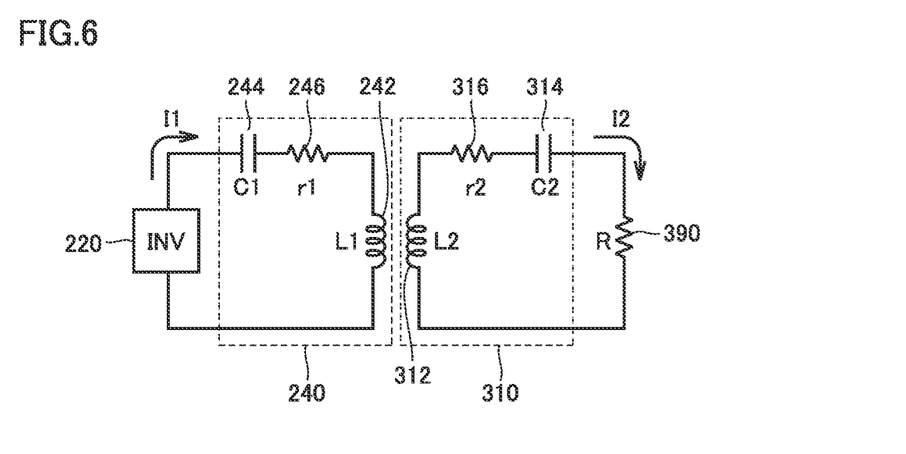
FIG. 6 is an equivalent circuit diagram for illustrating the power transfer efficiency from the power transmission device to the power reception device.

FIG. 6 is an equivalent circuit diagram for illustrating the power transfer efficiency from power transmission device 240 to power reception device 310. Referring to FIG. 6, in power transmission device 240, L1 represents an inductance of coil 242, and C1 represents a capacitance of capacitor 244. A resistance component 246 represents a wiring resistance of coil 242, and a resistance value thereof is indicated by r1. In this equivalent circuit diagram, filter circuit 230 (FIG. 1) of power transmission apparatus 10 is omitted.

On the other hand, in power reception device 310, L2 represents an inductance of coil 312, and C2 represents a capacitance of capacitor 314. A resistance component 316 represents a wiring resistance of coil 312, and a resistance value thereof is indicated by r2. A load 390 collectively represents the circuit after filter circuit 320 (FIG. 1) in power reception apparatus 20, and a resistance value thereof is indicated by R.

Using these circuit constants, power transfer efficiency η between coils 242 and 312 can be expressed like the following equation:

$$\eta = R/\{R + r2 + r1(|I1/I2|^2)\} \quad (1).$$

I1 represents a current flowing through power transmission device 240, and I2 represents a current flowing through power reception device 310. When the received power is constant, current I2 is almost constant, and thus, it can be seen from the equation (1) that power transfer efficiency η is inversely proportional to the square of current I1. Therefore, as current Is flowing through power transmission device 240 becomes smaller, power transfer efficiency η becomes higher.

Figure 7:
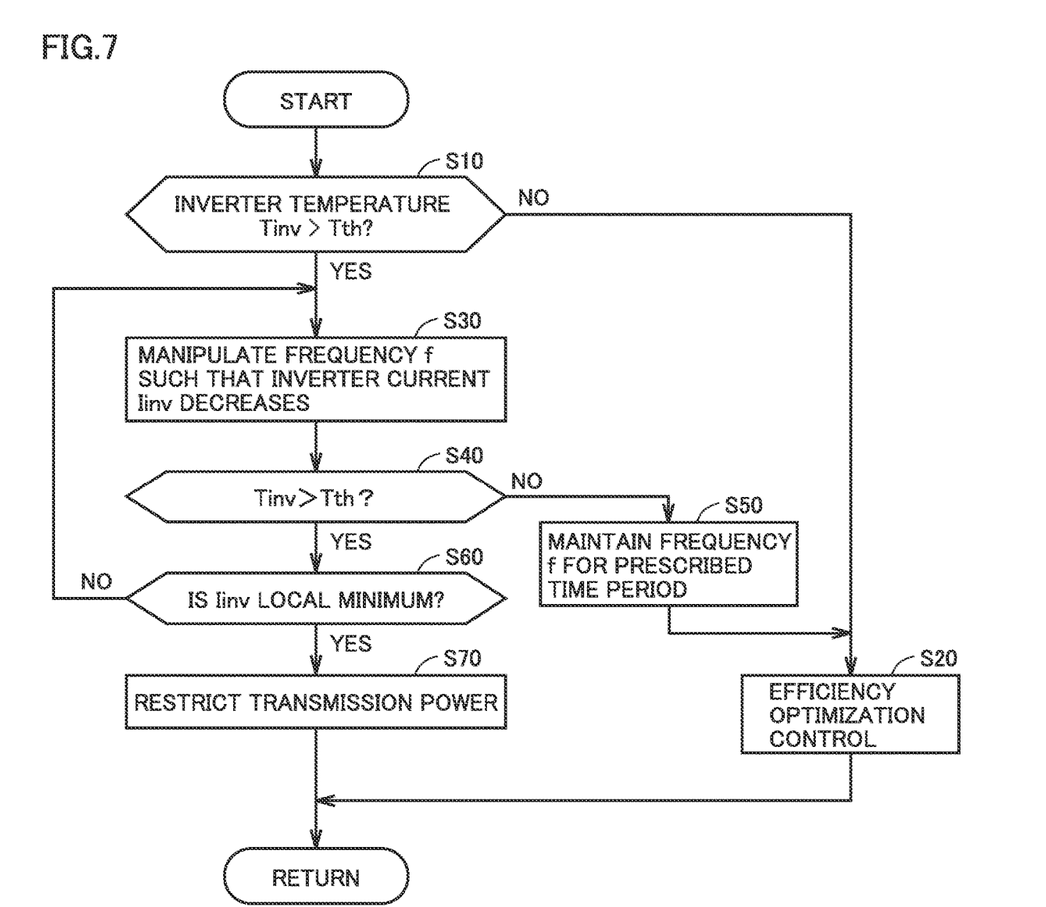
FIG. 7 is a flowchart for illustrating temperature suppression control for the inverter executed by a power supply ECU.

FIG. 7 is a flowchart for illustrating the temperature suppression control for inverter 220 executed by power supply ECU 250. The process shown in this flowchart is invoked from the main routine and executed at prescribed time intervals or when a prescribed condition is satisfied.

Referring to FIG. 7, power supply ECU 250 obtains the detection value of temperature Tinv of inverter 220 from temperature sensor 276, and determines whether or not temperature Tinv of inverter 220 is higher than a limit temperature Tth (step S10). Limit temperature Tth is set at, for example, a temperature having an appropriate margin with respect to an upper limit of the temperature of inverter 220.

When it is determined that temperature Tinv is equal to or lower than limit temperature Tth (NO in step S10), power supply ECU 250 executes the above-described efficiency optimization control (step S20). That is, power supply ECU 250 obtains the detection value of current Is flowing through power transmission device 240 and the detection value of current Iinv flowing through inverter 220 from current sensors 274 and 272, respectively, and manipulates frequency f such that a sum of current Is and current Iinv decreases. Although not particularly shown, frequency f may be manipulated such that a total value of appropriately weighted current Is and current Iinv decreases.

On the other hand, when it is determined in step S10 that temperature Tinv is higher than limit temperature Tth (YES in step S10), power supply ECU 250 executes the above-described temperature suppression control. That is, power supply ECU 250 manipulates frequency f such that current Iinv of inverter 220 decreases (step S30). Although not particularly shown, the transmission power is maintained at the target power by the transmission power control.

When frequency f is manipulated, power supply ECU 250 again determines whether or not temperature Tinv is higher than limit temperature Tth (step S40). When temperature Tinv becomes equal to or lower than limit temperature Tth as a result of the manipulation of frequency f in step S30 (NO in step S40), power supply ECU 250 maintains frequency f for a prescribed time period (step S50), and then, moves the process to step S20. A reason why frequency f is maintained for the prescribed time period in step S50 is to prevent temperature Tinv from exceeding limit temperature Tth again immediately after the process proceeds to step S20 and the efficiency optimization control is executed.

When it is determined in step S40 that temperature Tinv is higher than limit temperature Tth (YES in step S40), power supply ECU 250 determines whether or not current Iinv reaches a local minimum (step S60). For example, when current Iinv turns from decrease to increase as a result of the manipulation of frequency f in step S30, it can be determined that current Iinv reaches the local minimum.

When current Iinv does not reach the local minimum (NO in step S60), power supply ECU 250 returns the process to step S30 and frequency f is manipulated again such that current Iinv decreases.

On the other hand, when it is determined in step S60 that current Iinv reaches the local minimum (YES in step S60), power supply ECU 250 executes the control for restricting the transmission power (step S70). For example, power supply ECU 250 reduces the transmission power by reducing the target power in the transmission power control. The transmission power is reduced because current Iinv reaches the local minimum as a result of the manipulation of the frequency and thus current Iinv cannot be reduced by the manipulation of the frequency.

Figure 8:
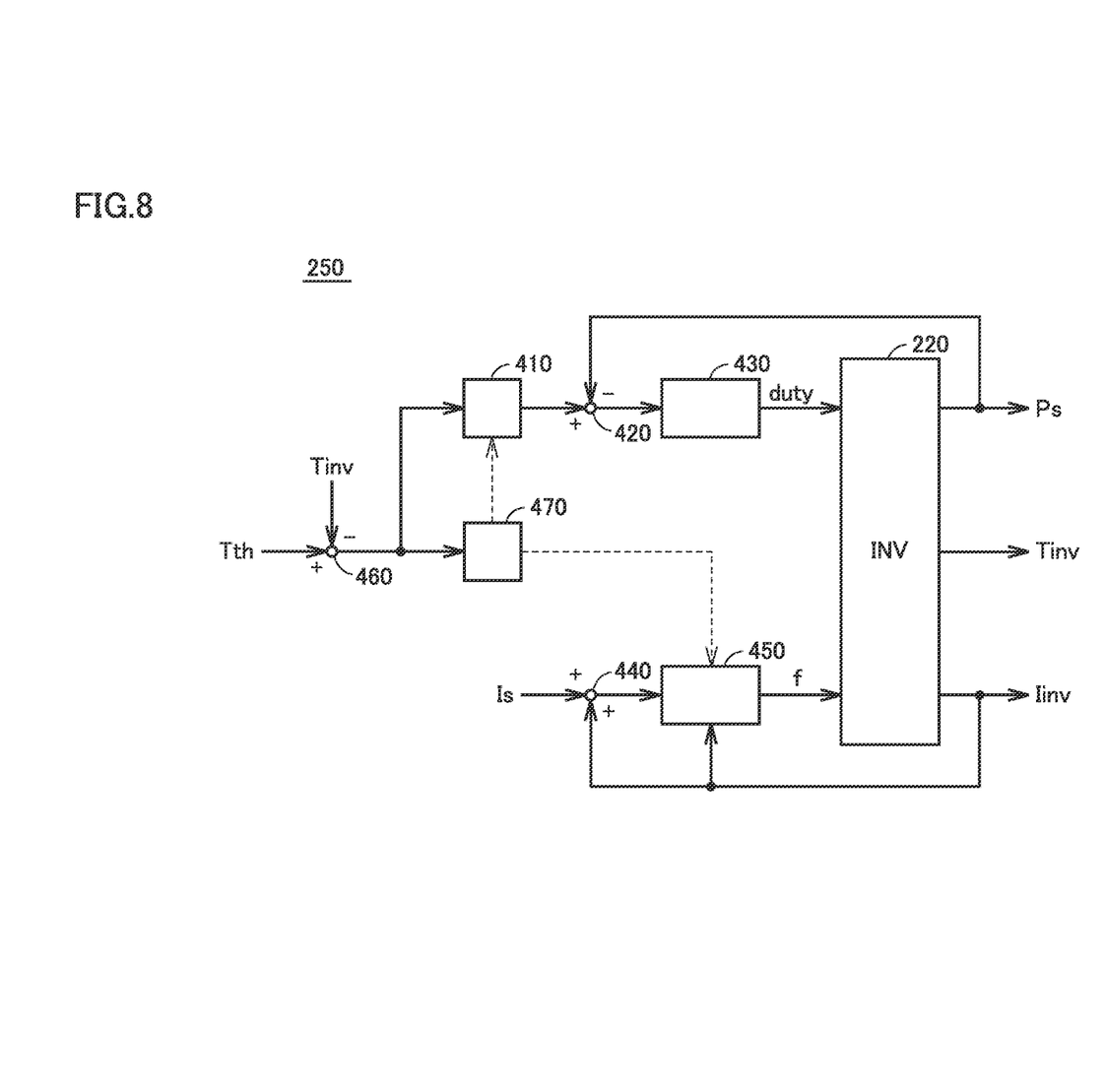
FIG. 8 is a control block diagram of transmission power control and frequency control executed by the power supply ECU.

FIG. 8 is a control block diagram of the transmission power control and the frequency control executed by power supply ECU 250. Referring to FIG. 8, power supply ECU 250 includes a target power calculation unit 410, subtraction units 420 and 460, controllers 430 and 450, an addition unit 440, and a determination unit 470. A feedback loop formed by target power calculation unit 410, subtraction unit 420, controller 430, and inverter 220 to be controlled constitutes the transmission power control. On the other hand, a feedback loop formed by addition unit 440, controller 450 and inverter 220 constitutes the frequency control.

Target power calculation unit 410 calculates the target power indicating a target of the transmission power. When target power calculation unit 410 does not receive a power restriction command (described below) from determination unit 470, target power calculation unit 410 sets the target power received from power reception apparatus 20. When target power calculation unit 410 receives the power restriction command from determination unit 470, target power calculation unit 410 reduces the target power in accordance with an excess $\Delta T$ of temperature Tinv of inverter 220 with respect to limit temperature Tth. This processing for reducing the target power corresponds to the processing in step S70 shown in FIG. 7.

Subtraction unit 420 subtracts the detection value of transmission power Ps from the target power received from target power calculation unit 410, and outputs the calculation value to controller 430. The detection value of transmission power Ps is calculated based on, for example, the detection values of voltage sensor 270 and current sensor 272 shown in FIG. 1.

Controller 430 generates a duty command value duty of the inverter output voltage based on a difference between the target power (output of target power calculation unit 410) and transmission power Ps. Controller 430 executes PI control (proportional integral control) using the difference between the target power and transmission power Ps (output of subtraction unit 420) as an input, to thereby calculate an amount of manipulation, and outputs the calculated amount of manipulation as duty command value duty.

On the other hand, addition unit 440 calculates a sum of the detection value of current Is flowing through power transmission coil 242 and the detection value of current Iinv flowing through inverter 220, and outputs the calculation value to controller 450.

When controller 450 does not receive a current reduction command (described below) from determination unit 470, controller 450 calculates an amount of manipulation of frequency f for shifting frequency f such that the sum of current Is and current Iinv (output of addition unit 440) decreases. For example, controller 450 increases or decreases frequency f and shifts frequency f such that the sum of current Is and current Iinv decreases. The above-described processing executed by controller 450 when controller 450 does not receive the current reduction command from determination unit 470 corresponds to the processing executed in the efficiency optimization control in step S20 shown in FIG. 7.

On the other hand, when controller 450 receives the current reduction command from determination unit 470, controller 450 calculates an amount of manipulation of frequency f for shifting frequency f such that current Iinv of inverter 220 decreases. For example, controller 450 increases or decreases frequency f and shifts frequency f such that current Iinv decreases. The above-described processing executed by controller 450 when controller 450 receives the current reduction command from determination unit 470 corresponds to the processing executed in step S30 shown in FIG. 7.

Subtraction unit 460 subtracts the detection value of temperature Tinv from limit temperature Tth of inverter 220, and outputs calculation value $\Delta T$ to determination unit 470 and target power calculation unit 410. Temperature Tinv is detected by temperature sensor 276 shown in FIG. 1.

Determination unit 470 receives difference $\Delta T$ between limit temperature Tth and temperature Tinv, and when temperature Tinv is higher than limit temperature Tth, determination unit 470 outputs the current reduction command to controller 450. As described above, when controller 450 receives the current reduction command from determination unit 470, controller 450 shifts frequency f such that current Iinv of inverter 220 decreases.

When current Iinv reaches the local minimum during output of the current reduction command to controller 450, determination unit 470 outputs the power restriction command to target power calculation unit 410. As described above, when target power calculation unit 410 receives the power restriction command from determination unit 470, target power calculation unit 410 reduces the target power of the transmission power.

As described above, in the first embodiment, when temperature Tinv of inverter 220 exceeds limit temperature Tth, frequency f is adjusted such that current Iinv of inverter 220 decreases. As a result, the loss (heat generation) of inverter 220 decreases and the temperature of inverter 220 can be effectively reduced. In addition, when transmission power Ps is reduced, the time of charging of power storage device 350 by power transmission apparatus 10 lengthens. However, in the above-described control, the transmission power is maintained, and thus, lengthening of the charging time can be avoided.

Second Embodiment

In the first embodiment, when temperature Tinv of inverter 220 exceeds limit temperature Tth, frequency f is adjusted such that current Iinv of inverter 220 decreases, while maintaining the magnitude of transmission power Ps.

In a second embodiment, when temperature Tinv exceeds limit temperature Tth, frequency f is adjusted such that the loss of inverter 220 decreases, while maintaining the magnitude of transmission power Ps. The loss of inverter 220 includes a loss caused by current Iinv flowing through inverter 220, and a loss caused by a recovery current flowing through the freewheeling diodes of inverter 220 due to a turn-on current of inverter 220. When the recovery current flows through the freewheeling diodes, heat generation in the freewheeling diodes increases and the loss of inverter 220 increases.

Accordingly, in the second embodiment, frequency f is adjusted such that the loss of inverter 220 decreases, with consideration given to the loss caused by the recovery current flowing through the freewheeling diodes due to the turn-on current. As a result, when temperature Tinv exceeds limit temperature Tth, the temperature of inverter 220 can be effectively reduced.

Figure 9:
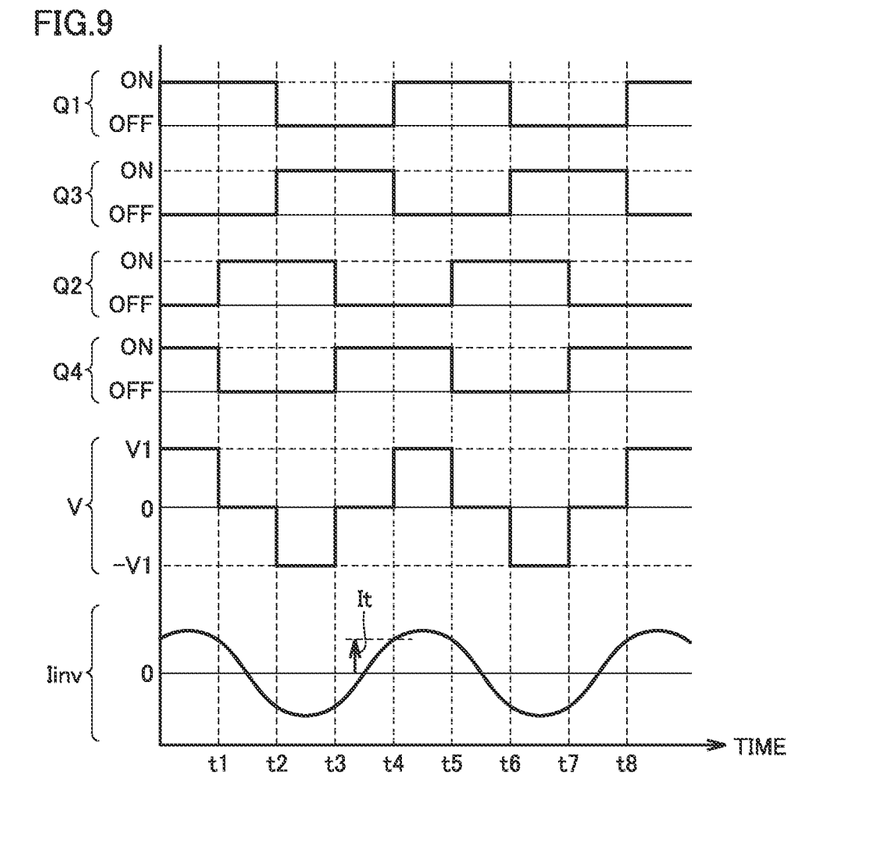
FIG. 9 shows switching waveforms of the inverter, and waveforms of an output voltage and an output current of the inverter.

FIG. 9 shows switching waveforms of inverter 220 and waveforms of output voltage V and output current Iinv. One cycle from times t4 to t8 will be described as one example with reference to FIG. 3 together with FIG. 9. At time t4, when switching element Q1 is switched from OFF to ON and switching element Q3 is switched from ON to OFF, with switching elements Q2 and Q4 being OFF and ON, respectively (state shown in FIG. 3), output voltage V of inverter 220 rises from 0 to V1 (positive value).

At time t5, when switching element Q2 is switched from OFF to ON and switching element Q4 is switched from ON to OFF, with switching elements Q1 and Q3 being ON and OFF, respectively, output voltage V changes to 0.

At time t6, when switching element Q1 is switched from ON to OFF and switching element Q3 is switched from OFF to ON, with switching elements Q2 and Q4 being ON and OFF, respectively, output voltage V changes to −V1 (negative value).

At time t7, when switching element Q2 is switched from ON to OFF and switching element Q4 is switched from OFF to ON, with switching elements Q1 and Q3 being OFF and ON, respectively, output voltage V changes to 0 again.

At time t8 after one cycle from time t4, when switching element Q1 is switched from OFF to ON and switching element Q3 is switched from ON to OFF, with switching elements Q2 and Q4 being OFF and ON, respectively, output voltage V rises from 0 to V1 (positive value) (state identical to the state at time t4).

FIG. 9 shows the case in which the duty of output voltage V is 0.25. The duty of output voltage V can be changed by changing the switching timing of switching elements Q1 and Q3 and the switching timing of switching elements Q2 and Q4. As described above, the magnitude of the transmission power can be changed by adjusting this duty of output voltage V. Qualitatively, the transmission power can be increased by increasing the duty, and the transmission power can be decreased by decreasing the duty.

An instantaneous value It of output current Iinv at the time of rising of output voltage V (time t4 and time t8) corresponds to the turn-on current. The value of the turn-on current It changes in accordance with voltage V1 provided from PFC circuit 210 to inverter 220 and the operation frequency of inverter 220 (frequency of the transmission power), and the case in which positive turn-on current It flows is described here.

When positive turn-on current It flows, the current in the opposite direction, i.e., the recovery current, flows through freewheeling diode D3 connected in antiparallel to switching element Q3. When the recovery current flows through freewheeling diode D3, heat generation in freewheeling diode D3 increases and the loss of inverter 220 increases. When turn-on current It is equal to or lower than 0, the recovery current does not flow through freewheeling diode D3 and the loss of inverter 220 is suppressed.

When the operation frequency of inverter 220 (frequency of the transmission power) changes, turn-on current It changes and the recovery current flowing through freewheeling diode D3 also changes. Accordingly, in the second embodiment, when temperature Tinv exceeds limit temperature Tth, frequency f is adjusted such that the loss of inverter 220 including the loss caused by the recovery current decreases, while maintaining the magnitude of transmission power Ps by the transmission power control (duty adjustment).

The overall configuration of the power transfer system in the second embodiment is basically identical to that of the power transfer system in the first embodiment shown in FIG. 1. A difference between the configuration of the power transfer system in the second embodiment and the configuration of the power transfer system shown in FIG. 1 is that the power transfer system in the second embodiment includes a power supply ECU 250A instead of power supply ECU 250.

Figure 10:
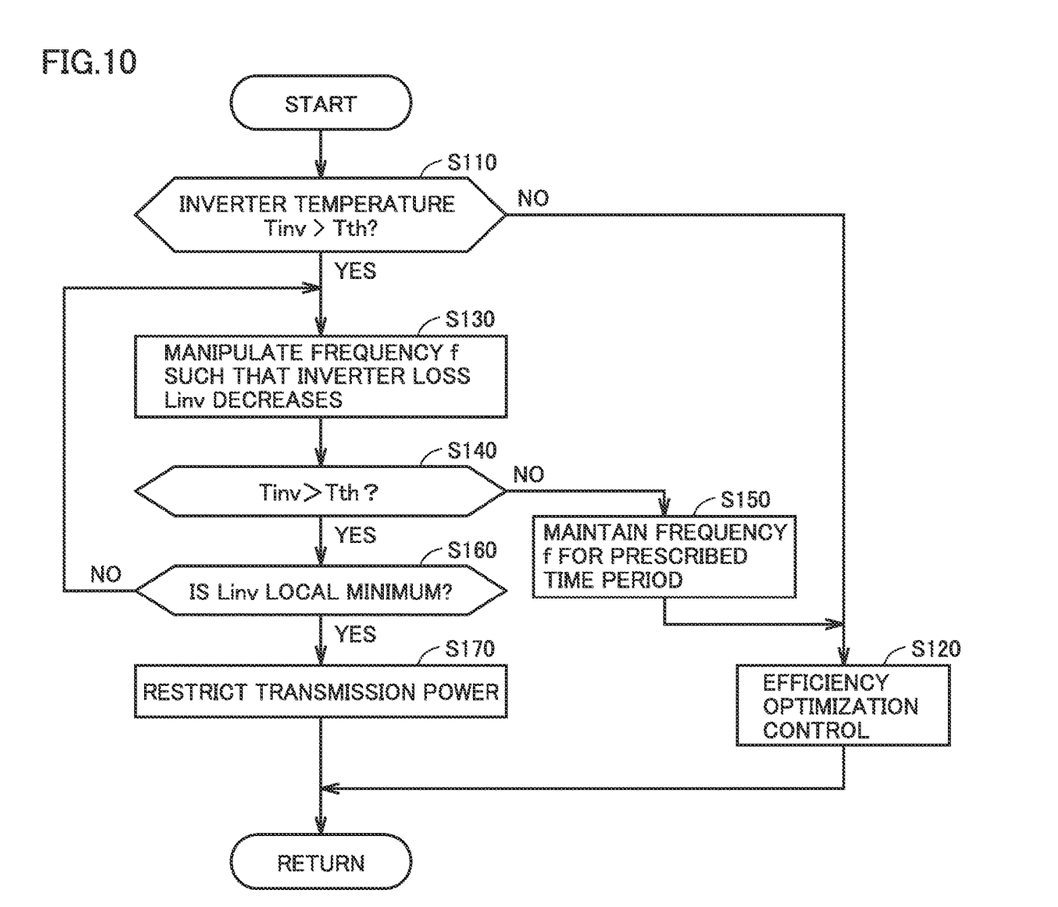
FIG. 10 is a flowchart for illustrating inverter temperature suppression control executed by a power supply ECU in a second embodiment.

FIG. 10 is a flowchart for illustrating the temperature suppression control for inverter 220 executed by power supply ECU 250A in the second embodiment. The process shown in this flowchart is also invoked from the main routine and executed at prescribed time intervals or when a prescribed condition is satisfied.

Referring to FIG. 10, the processing in steps S110, S120, S140, S150, and S170 is identical to the processing in steps S10, S20, S40, S50, and S70 shown in FIG. 7, respectively.

In the second embodiment, when it is determined in step S110 that temperature Tinv of inverter 220 is higher than limit temperature Tth (YES in step S110), power supply ECU 250A manipulates frequency f such that a loss Linv of inverter 220 decreases (step S130). Loss Linv includes the loss caused by current Iinv flowing through inverter 220, and the loss caused by the recovery current flowing through freewheeling diode D3 due to the turn-on current of inverter 220.

The loss caused by current Iinv flowing through inverter 220 can be calculated using various known calculation methods. The loss caused by the recovery current can be obtained based on the detection value of turn-on current It, for example, by preliminarily obtaining the relation between the magnitude of turn-on current It and the loss caused by the recovery current and creating a map and the like. Although not particularly shown, the transmission power is maintained at the target power by the transmission power control.

When frequency f is manipulated in step S130, the process proceeds to step S140 and it is again determined whether or not temperature Tinv is higher than limit temperature Tth. When it is determined in step S140 that temperature Tinv is higher than limit temperature Tth (YES in step S140), power supply ECU 250A determines whether or not loss Linv reaches a local minimum (step S160). For example, when loss Linv turns from decrease to increase as a result of the manipulation of frequency f in step S130, it can be determined that loss Linv reaches the local minimum.

When it is determined in step S160 that loss Linv does not reach the local minimum (NO in step S160), power supply ECU 250A returns the process to step S130 and frequency f is again manipulated such that loss Linv decreases.

On the other hand, when it is determined in step S160 that loss Linv reaches the local minimum (YES in step S160), the process proceeds to step S170 and the control for restricting the transmission power is executed. Similarly to step S70 in FIG. 7, power supply ECU 250A reduces the transmission power by reducing the target power in the transmission power control, for example.

Figure 11:
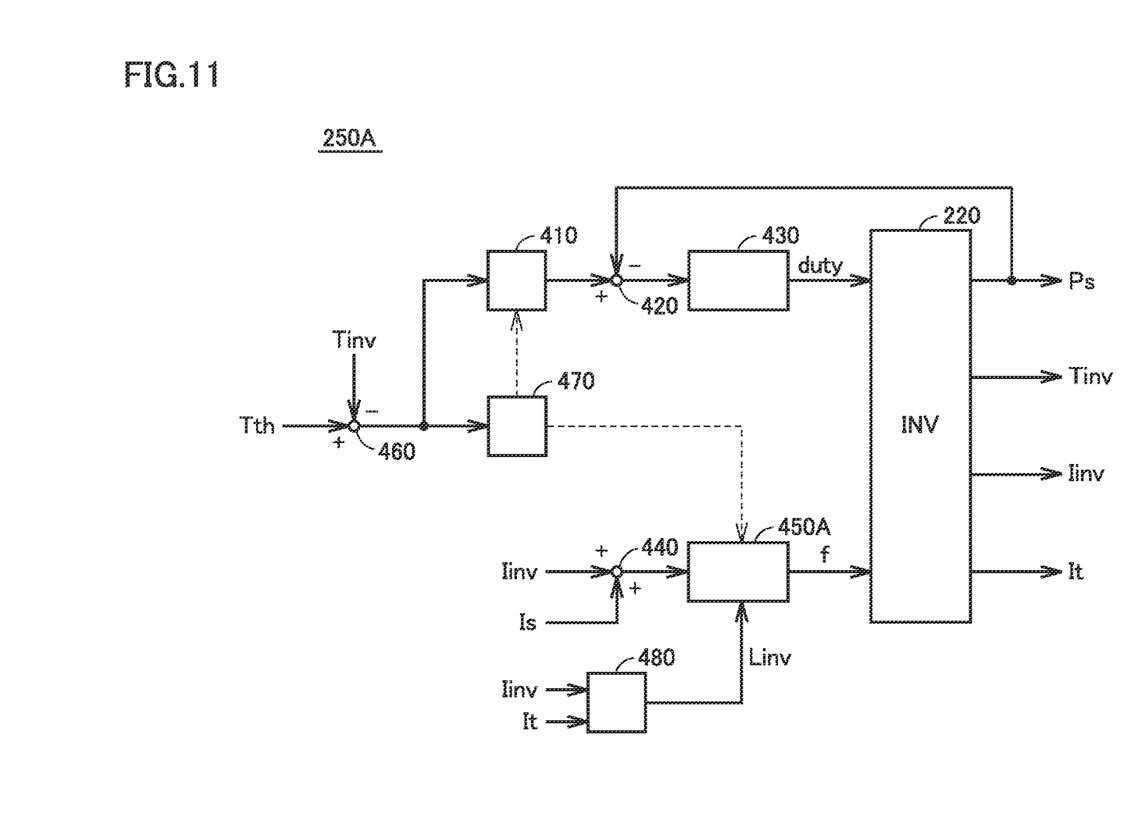
FIG. 11 is a control block diagram of transmission power control and frequency control executed by the power supply ECU in the second embodiment.

FIG. 11 is a control block diagram of the transmission power control and the frequency control executed by power supply ECU 250A in the second embodiment. Referring to FIG. 11, a difference between the configuration of power supply ECU 250A and the configuration of power supply ECU 250 in the first embodiment shown in FIG. 8 is that power supply ECU 250A further includes a loss calculation unit 480 and includes a controller 450A instead of controller 450.

Loss calculation unit 480 receives the detection value of current Iinv flowing through inverter 220 and the detection value of turn-on current It. The detection value of turn-on current It is a detection value (instantaneous value) of current sensor 272 when rising of output voltage V of inverter 220 is detected by voltage sensor 270.

Loss calculation unit 480 calculates the loss caused by current Iinv based on the detection value of current Iinv, and calculates the loss caused by the recovery current based on the detection value of turn-on current It. As described above, the loss caused by current Iinv can be calculated using various known calculation methods, and the loss caused by the recovery current is obtained from the detection value of turn-on current It using the preliminarily prepared map and the like. Loss calculation unit 480 outputs a sum of the loss caused by current Iinv and the loss caused by the recovery current to controller 450A as loss Linv of inverter 220.

When controller 450A does not receive the current reduction command from determination unit 470, controller 450A calculates an amount of manipulation of frequency f for shifting frequency f such that the sum of current Is and current Iinv (output of addition unit 440) decreases. This processing corresponds to the processing executed in the efficiency optimization control in step S120 shown in FIG. 10.

On the other hand, when controller 450A receives the current reduction command from determination unit 470, controller 450A calculates an amount of manipulation of frequency f for shifting frequency f such that loss Linv of inverter 220 decreases. For example, controller 450A increases or decreases frequency f, and shifts frequency f such that loss Linv decreases. This processing corresponds to the processing executed in step S130 shown in FIG. 10.

As described above, according to the second embodiment, when the temperature of inverter 220 exceeds the limit temperature, the loss of inverter 220 can be reduced, with consideration given to the loss caused by the recovery current. As a result, the temperature of inverter 220 can be effectively reduced.

The embodiments disclosed herein are also intended to be implemented in combination as appropriate. It should be understood that the embodiments disclosed herein are illustrative and non-restrictive in every respect. The scope of the present disclosure is defined by the terms of the claims, rather than the description of the embodiments above, and is intended to include any modifications within the scope and meaning equivalent to the terms of the claims.

What is claimed is:

1. A wireless power transmission apparatus comprising:
a power transmission device configured to wirelessly transmit electric power to a power reception apparatus;
an inverter configured to generate transmission power having a prescribed frequency and supply the transmission power to the power transmission device; and
a control device configured to control the inverter,
the control device being configured to:
adjust magnitude of the transmission power by adjusting a duty of an output voltage of the inverter;
adjust the frequency by controlling the inverter;
determine whether a temperature of the inverter exceeds a limit temperature;
execute first control for adjusting the frequency such that a loss of the inverter decreases while maintaining the transmission power, when the temperature of the inverter is determined to exceed the limit temperature; and
execute second control for reducing the transmission power, when the temperature of the inverter is determined to exceed the limit temperature even if the first control is executed.

2. The wireless power transmission apparatus according to claim 1, wherein
the first control includes control for adjusting the frequency such that a current of the inverter decreases while maintaining the transmission power, when the temperature of the inverter is determined to exceed the limit temperature.

3. The wireless power transmission apparatus according to claim 1, wherein the loss of the inverter includes:
a loss caused by a current flowing through the inverter; and
a loss caused by a recovery current flowing through a freewheeling diode of the inverter.

4. A power transfer system comprising:
a power transmission apparatus; and
a power reception apparatus configured to wirelessly receive electric power from the power transmission apparatus,
the power transmission apparatus including:
a power transmission device configured to wirelessly transmit the electric power to the power reception apparatus;
an inverter configured to generate transmission power having a prescribed frequency and supply the transmission power to the power transmission device; and
a control device configured to control the inverter, the control device being configured to:
adjust magnitude of the transmission power by adjusting a duty of an output voltage of the inverter;
adjust the frequency by controlling the inverter;
determine whether a temperature of the inverter exceeds a limit temperature;
execute first control for adjusting the frequency such that a loss of the inverter decreases while maintaining the transmission power, when the temperature of the inverter is determined to exceed the limit temperature; and
execute second control for reducing the transmission power, when the temperature of the inverter is determined to exceed the limit temperature even if the first control is executed.

* * * * *

UNITED STATES PATENT AND TRADEMARK OFFICE
CERTIFICATE OF CORRECTION

PATENT NO. : 10,797,525 B2
APPLICATION NO. : 16/190932
DATED : October 6, 2020
INVENTOR(S) : Takahiro Misawa Page 1 of 1

It is certified that error appears in the above-identified patent and that said Letters Patent is hereby corrected as shown below:

On the Title Page

Item (72), inventor 1, city, delete "Okazaki" and insert --Okazaki-shi Aichi-ken--, therefor.

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*